(12) United States Patent
Enomoto et al.

(10) Patent No.: US 9,475,722 B2
(45) Date of Patent: Oct. 25, 2016

(54) OPTICAL FIBER PRODUCING METHOD AND APPARATUS AND OPTICAL FIBER

(71) Applicant: SUMITOMO ELECTRIC INDUSTRIES, LTD., Osaka-shi, Osaka (JP)

(72) Inventors: Tadashi Enomoto, Yokohama (JP); Iwao Okazaki, Yokohama (JP); Takashi Yamazaki, Yokohama (JP); Masatoshi Hayakawa, Yokohama (JP); Manabu Shiozaki, Yokohama (JP); Norihiro Uenoyama, Yokohama (JP); Masaru Furusyou, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 276 days.

(21) Appl. No.: 14/345,699

(22) PCT Filed: Jan. 9, 2013

(86) PCT No.: PCT/JP2013/050218
§ 371 (c)(1),
(2) Date: Mar. 19, 2014

(87) PCT Pub. No.: WO2013/105579
PCT Pub. Date: Jul. 18, 2013

(65) Prior Publication Data
US 2014/0226948 A1   Aug. 14, 2014

(30) Foreign Application Priority Data

Jan. 10, 2012 (JP) ................................ 2012-001743
Sep. 7, 2012 (WO) .................. PCT/JP2012/072904

(51) Int. Cl.
*C03B 37/029* (2006.01)
*C03B 37/027* (2006.01)
(Continued)

(52) U.S. Cl.
CPC .......... *C03B 37/029* (2013.01); *C03B 37/027* (2013.01); *C03B 37/0253* (2013.01);
(Continued)

(58) Field of Classification Search
CPC ....................... C03B 2205/40; C03B 2205/70
See application file for complete search history.

(56) References Cited

U.S. PATENT DOCUMENTS 4,437,870 A * 3/1984 Miller ............... C03B 37/02718
65/157
4,673,427 A * 6/1987 Van Der Giessen . C03B 37/027
65/32.5
5,284,499 A * 2/1994 Harvey ................. C03B 37/029
65/430

(Continued)

FOREIGN PATENT DOCUMENTS

CN   1306499 A   8/2001
JP   H08-188439 A   7/1996
(Continued)

*Primary Examiner* — Charlie Y Peng
(74) *Attorney, Agent, or Firm* — Drinker Biddle & Reath LLP

(57) ABSTRACT

An apparatus includes a susceptor and a protective pipe. A gas containing 50% or more of argon or nitrogen is used as a gas to be supplied into the susceptor. The protective pipe has a heat insulating region (17*a*) enclosed with a heat insulator (18) with a length of Db (mm) at the upper section thereof and a non-heat insulating region (17*b*) not enclosed with any heat insulators at the lower section thereof. The temperature of the glass fiber at the outlet of the protective pipe becomes 1700° C. or less. The outer diameter of the glass fiber at the outlet of the protective pipe is within a range of the target outer diameter of the glass fiber+6 μm or less.

4 Claims, 5 Drawing Sheets

(51) Int. Cl.
*G02B 6/10* (2006.01)
*C03B 37/025* (2006.01)
*G02B 6/12* (2006.01)

(52) U.S. Cl.
CPC ........... *C03B37/02727* (2013.01); *G02B 6/10* (2013.01); *C03B 2205/30* (2013.01); *C03B 2205/40* (2013.01); *C03B 2205/56* (2013.01); *C03B 2205/63* (2013.01); *C03B 2205/70* (2013.01); *C03B 2205/92* (2013.01); *G02B 2006/12166* (2013.01); *Y02P 40/57* (2015.11)

(56) References Cited

U.S. PATENT DOCUMENTS

| | | | | |
|---|---|---|---|---|
| 5,545,246 | A * | 8/1996 | Lysson | C03B 37/029 65/435 |
| 5,637,130 | A * | 6/1997 | Nagayama | C03B 37/029 65/435 |
| 5,879,425 | A * | 3/1999 | Jensen | C03B 23/047 65/393 |
| 6,055,830 | A * | 5/2000 | Do | C03B 37/029 65/412 |
| 6,502,428 | B1 * | 1/2003 | Onishi | C03B 37/0253 65/378 |
| 6,546,760 | B1 * | 4/2003 | Tsuchiya | C03B 37/029 219/541 |
| 6,928,840 | B1 | 8/2005 | Nagayama et al. | |
| 2002/0078714 | A1 * | 6/2002 | Bird | C03B 37/027 65/427 |
| 2002/0178762 | A1 * | 12/2002 | Foster | C03B 37/027 65/424 |
| 2005/0259932 | A1 | 11/2005 | Nagayama et al. | |
| 2006/0101861 | A1 | 5/2006 | Nagayama et al. | |
| 2009/0038345 | A1 * | 2/2009 | Otosaka | C03B 37/029 65/424 |

FOREIGN PATENT DOCUMENTS

| | | |
|---|---|---|
| JP | H10-182181 A | 7/1998 |
| JP | A-2002-356343 | 12/2002 |
| JP | 2003-176149 A | 6/2003 |
| JP | 2003-335545 A | 11/2003 |
| JP | 2004-224587 A | 8/2004 |
| JP | A-2006-058494 | 3/2006 |
| JP | 2006-240930 A | 9/2006 |
| JP | 4356155 B2 | 11/2009 |
| JP | 4663277 B2 | 4/2011 |

* cited by examiner

FIG. 5

| Sample No. | Gas | Heat insulating region | V/Da | V/Db | Gr/Re² | Outlet temperature [°C] | Variation in glass fiber diameter [μm] | Glass fiber outer diameter at protective pipe outlet [μm] | Reflectance peak [cm⁻¹] | Absorption peak [cm⁻¹] | Clad stress [MPa·μm] | Transmission loss [dB/km] | | Evaluation result |
|---|---|---|---|---|---|---|---|---|---|---|---|---|---|---|
| 1 | 100%He | Not provided | 2.3 | ∞ | 0.50 | 1380 | ±0.09 | 125.1 | 1119.73 | 2248.15 | 1.1 | 0.192 | × | Loss not lowered |
| 2 | 50%Ar +50%He | Not provided | 2.3 | ∞ | 1.60 | 1610 | ±0.53 | 129.8 | - | - | - | - | × | Gr/Re²≥1 Diameter variation |
| 3 | 85%Ar +15%He | Not provided | 2.3 | ∞ | 2.10 | 1750 | ±0.84 | 134.7 | - | - | - | - | × | Large outer diameter variation |
| 4 | 100%Ar | Provided | 1.15 | 2.3 | 1.50 | 1710 | ±0.51 | 129.2 | - | - | - | - | × | Gr/Re²≥1 Diameter variation |
| 5 | 50%Ar +50%He | Provided | 1.15 | 4.6 | 1.00 | 1300 | ±0.09 | 125.1 | 1119.80 | 2248.41 | 0.6 | 0.187 | × | Loss > target |
| 6 | 50%Ar +50%He | Provided | 1.15 | 2.3 | 1.00 | 1350 | ±0.10 | 125.1 | 1119.83 | 2248.54 | 0.5 | 0.185 | ○ | Target reached |
| 7 | 100%Ar | Provided | 1.15 | 2.3 | 0.10 | 1700 | ±0.40 | 131.0 | 1119.89 | 2248.73 | 0.4 | 0.18 | △ | Proper Diameter variation |
| 8 | 100%Ar | Provided | 0.88 | 2.3 | 0.10 | 1650 | ±0.15 | 126.6 | 1119.94 | 2248.92 | 0.4 | 0.181 | ○ | Target reached |
| 9 | 85%Ar +15%He | Provided | 1.15 | 7.7 | 0.10 | 1590 | ±0.11 | 125.2 | 1119.85 | 2248.59 | 0.5 | 0.185 | ○ | Target reached |
| 10 | 100%Ar | Provided | 1.15 | 7.7 | 0.10 | 1695 | ±0.39 | 130.9 | 1119.87 | 2248.67 | 0.4 | 0.181 | △ | Proper Diameter variation |
| 11 | 85%Ar +15%He | Provided | 0.88 | 7.7 | 0.10 | 1480 | ±0.10 | 125.1 | 1119.84 | 2248.57 | 0.5 | 0.185 | ○ | Target reached |
| 12 | 100%Ar | Provided | 0.88 | 7.7 | 0.10 | 1645 | ±0.15 | 126.4 | 1119.90 | 2248.80 | 0.4 | 0.183 | ○ | Target reached |
| 13 | 100%Ar | Provided | 0.88 | 2.3 | 0.10 | 1500 | ±0.10 | 125.1 | 1120.00 | 2249.18 | 0.4 | 0.181 | ○ | Target reached |
| 14 | 100%Ar | Provided | 0.88 | 7.7 | 0.10 | 1460 | ±0.10 | 125.1 | 1119.97 | 2249.05 | 0.4 | 0.182 | ○ | Target reached |

OPTICAL FIBER PRODUCING METHOD AND APPARATUS AND OPTICAL FIBER

TECHNICAL FIELD

The present invention relates to a method and an apparatus for producing an optical fiber by drawing a glass fiber while heating and melting an optical fiber preform, and to an optical fiber to be obtained using the method and the apparatus.

BACKGROUND ART

An optical fiber is produced by heating and melting an optical fiber preform (hereafter referred to as a preform) using a dedicated drawing furnace, by drawing a glass fiber and by applying protective coating to the external surface thereof. The drawing furnace has a configuration in which a susceptor into which the preform is inserted is disposed inside the furnace body thereof, a heating apparatus disposed outside the susceptor heats the susceptor, a glass fiber is allowed to droop from the lower end of the heated and melted preform, and the glass fiber is pulled out through the lower outlet of the susceptor. The susceptor is usually made of heat-resisting carbon; however, a gas (hereafter referred to as an inert gas or the like), such as a rare gas, for example, argon (Ar) or helium (He), or nitrogen ($N_2$) is supplied into the susceptor to prevent the oxidation of the susceptor.

The inert gas or the like having been supplied into the susceptor flows from the upper side to the lower side of the susceptor in many cases; in such a case, the gas is discharged from the lower side of the susceptor to the outside together with the glass fiber having been drawn from the preform. In the case that a thick preform is drawn, the space around the neck-down region of the preform becomes large, and the temperature distribution of the gas flowing in the space becomes non-uniform; as a result, the variation in the diameter of the glass fiber to be drawn tends to become large. If the variation in the diameter of the glass fiber becomes larger, a problem, such as a greater connection loss at the time of connector connection, may occur. To solve this problem, a method for suppressing the variation in the diameter of the glass fiber by using He gas having high thermal conductivity as an inert gas or the like and by making the temperature distribution uniform is used in some cases. Furthermore, a protective pipe (also referred to as a lower chimney or a lower extension pipe) is provided at the lower section of the susceptor to keep the glass fiber away from the outside air immediately after the drawing, thereby suppressing the variation in the diameter of the glass fiber.

However, since He gas has high thermal conductivity, in the case that He gas is used inside the protective pipe, the glass fiber is cooled quickly. In the glass fiber having been heated and melted, the atoms and molecules inside the glass vibrate due to the thermal energy thereof, and the arrangements of the atoms and molecules are disordered, whereby the atoms and molecules being in the disordered states are rearranged and the structural relaxation of the glass is promoted while the glass is cooled, and equilibrium is reached at a predetermined temperature and the glass is frozen and solidified. The equilibrium temperature serving as an indicator of the disorder in the glass structure is also referred to as fictive temperature; in the case that the glass is cooled slowly, the disordered states of the atoms and molecules inside the glass are relieved gradually, and the fictive temperature is shifted to the lower temperature side. On the other hand, if the glass is cooled quickly, the glass is frozen and solidified while the rearrangements of the atoms and molecules inside the glass are disordered, and the fictive temperature is shifted to the higher temperature side.

As described above, in the case that He gas is used, the glass fiber being in the heated and melted state immediately after the drawing is cooled quickly inside the protective pipe by He gas having high thermal conductivity, and the glass is frozen while the atoms and molecules inside the glass are disordered; as a result, the fictive temperature is high and the Rayleigh scattering intensity of the optical fiber cannot be reduced; hence, it is said that transmission loss increases.

To cope with the above-mentioned problem, for example, Patent Document 1 discloses a method for suppressing the glass fiber from being cooled quickly by providing a gas mixture layer in which He gas is mixed with a gas having low thermal conductivity between the neighborhood of the outlet of the susceptor and the protective pipe.

Patent Document 2 discloses a method for slowly cooling the glass fiber by introducing the drawn glass fiber into a slow cooling section and by keeping the glass fiber at room temperature or heating the glass fiber using Ar gas serving as a temperature adjustment gas.

Patent Document 3 discloses a method for decreasing transmission loss by performing heat treatment (slow cooling) when the glass fiber is drawn from the preform to set the fictive temperature in a predetermined range and by decreasing the residual stress (tensile stress) of the glass fiber in the direction from the inside to the outside of the clad layer to decrease the difference in the distribution of the residual stress in the radial direction.

PRIOR ART DOCUMENT

Patent Document

Patent Document 1
JP-4356155-B
Patent Document 2
JP-2003-176149-A
Patent Document 3
JP-4663277-B

GENERAL DESCRIPTION OF THE INVENTION

Problem that the Invention is to Solve

Through the advancement of information technology, the applications of general-purpose optical fibers (single-mode optical fibers) range widely, for example, from long-distance optical signal transmission to relatively short-distance connection to households and LAN formation in households. Optical connectors are frequently used for optical fiber connection associated with these applications; in particular, the use of multi-core optical connectors is increasing. The connection of an optical fiber to such a multi-core optical connector is carried out by fitting a glass fiber into a fiber insertion hole formed highly accurately in a molded connector. In this case, if the diameter of the glass fiber is large, the glass fiber cannot be inserted; if the diameter of the glass fiber is small, the center of the glass fiber is not aligned with the center of the insertion hole, and a defect occurs due to connection loss. In other words, if the variation in the diameter of the glass fiber of the optical fiber to be used is large when the glass fiber is connected to a multi-core optical connector, problems, such as a low yield in production and an increase in connection loss, will be revealed.

As described above, in the process of drawing a glass fiber from a preform, the use of He gas is required to decrease the variation in the diameter of the glass fiber of the optical fiber. However, He gas is very expensive in comparison with the other inert gases and the like, such as Ar gas and $N_2$ gas; hence the use of He gas constitutes a major factor in increasing the production cost of the optical fiber. To solve this problem, a proposal has been made wherein He gas is recovered and reused; however, this requires a large-scale system, thereby being unreasonable in initial investment and running cost.

Furthermore, the glass fiber immediately after the drawing is required to be cooled slowly to decrease its transmission loss; however, the installation of such a gas supply device and a heater for slow cooling as disclosed in Patent Documents 1 to 3 also requires initial investment and running cost, and further requires time and efforts to set conditions and to make adjustments.

In consideration of the above-mentioned actual circumstances, the present invention is intended to provide a method and an apparatus for producing an optical fiber in which the increase in transmission loss is reduced while the variation in the diameter of a glass fiber is suppressed using an inexpensive inert gas or the like and inexpensive auxiliary devices, and to provide an optical fiber to be produced using the method and the apparatus.

Means for Solving the Problem

The optical fiber producing method and apparatus according to the present invention, the apparatus being equipped with a susceptor into which an optical fiber preform is inserted and a heater disposed outside the susceptor to heat the susceptor from the outside, are used to produce an optical fiber by drawing a glass fiber while the optical fiber preform is heated and melted and by drawing out the fiber through the outlet at the lower section of the susceptor to the outside.

A gas containing 50% or more of argon or nitrogen is used as a gas to be supplied into the susceptor, and a protective pipe with a length of Da (mm) is provided under the susceptor, the protective pipe having a heat insulating region enclosed with a heat insulator with a length of Db (mm) at the upper section thereof and a non-heat insulating region not enclosed with any heat insulators at the lower section thereof. When the drawing velocity of the glass fiber is V (m/min), the lengths of Da and Db are set to satisfy "V/Da≤1.2 and V/Db≤2.3" so that the temperature of the glass fiber at the outlet of the protective pipe becomes 1700° C. or less and so that the outer diameter of the glass fiber at the outlet of the protective pipe is within a range of the target outer diameter of the glass fiber+6 µm or less.

Furthermore, a gas containing 85% or more of argon or nitrogen is used as a gas to be supplied into the susceptor, and a protective pipe with a length of Da (mm) is provided under the susceptor, the protective pipe having a heat insulating region enclosed with a heat insulator with a length of Db (mm) at the upper section thereof and a non-heat insulating region not enclosed with any heat insulators at the lower section thereof; when the drawing velocity of the glass fiber is V (m/min), the lengths of Da and Db are set to satisfy "V/Da≤1.2 and V/Db≤7.7" so that the temperature of the glass fiber at the outlet of the protective pipe becomes 1700° C. or less and so that the outer diameter of the glass fiber at the outlet of the protective pipe is within a range of the target outer diameter of the glass fiber+6 µm or less.

In the above-mentioned configurations, it is further preferable that "V/Da≤1.0" should be satisfied, that the temperature of the glass fiber at the outlet of the protective pipe should be 1650° C. or less, and that the outer diameter of the glass fiber at the outlet of the protective pipe should be within a range of the target outer diameter of the glass fiber+1.6 µm or less.

It is preferable that the value obtained by dividing the Grashof number Gr inside the protective pipe by the square of the Reynolds number Re should be 1 or less.

In the optical fiber produced using the above-mentioned method, the variation in the diameter of the glass fiber is ±0.4 µm or less or ±0.15 µm or less, and the reflectance spectrum of the optical fiber around 1120 $cm^{-1}$ has a peak at 1119.83 $cm^{-1}$ or more, or the absorption spectrum around 2250 $cm^{-1}$ has a peak at 2248.54 $cm^{-1}$ or more.

It is also preferable that the residual stress of the optical fiber produced using the above-mentioned method should increase monotonously from the inside to the outside in the radial direction and that the gradient at the time when the tensile stress distribution in the above-mentioned region is subjected to straight-line approximation should have a value of +0.0 MPa/µm to +0.5 MPa/µm. The present invention is particularly suited for the case in which the drawing velocity is high (for example, a drawing velocity of 1000 m/min or more); hence, a highly productive optical fiber can be obtained at low cost while the quality thereof is maintained.

Advantage of the Invention

According to the present invention, the use of expensive He gas can be reduced; in addition, without the use of special devices for slowly cooling drawn glass fiber, it is possible to obtain an optical fiber having little variation in its diameter and having a transmission loss of a predetermined value or less.

BRIEF DESCRIPTION OF THE DRAWINGS

FIG. 5 is a table showing the results of evaluation according to the present invention.

MODE FOR CARRYING OUT THE INVENTION

Figure 1:
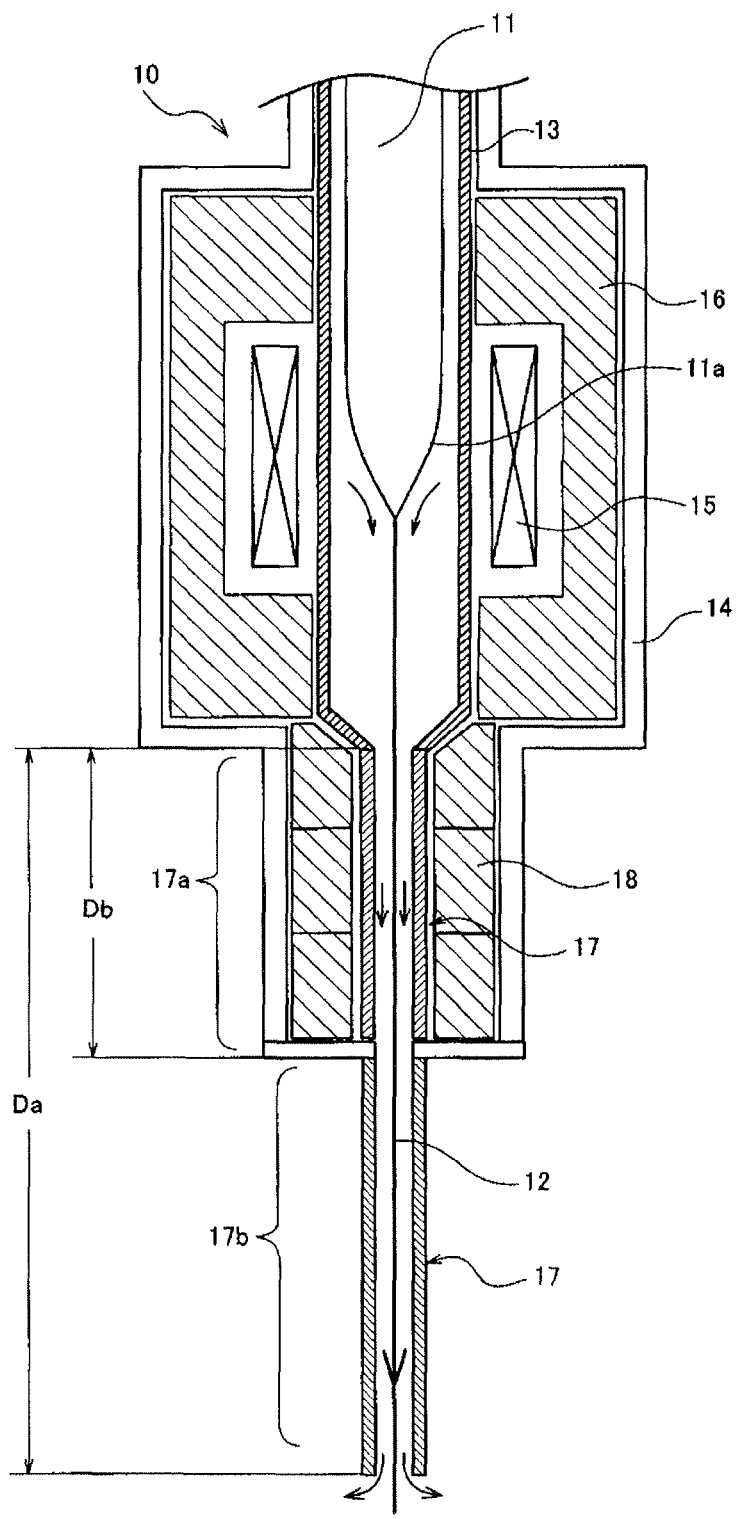
FIG. 1 is a view illustrating an example of a drawing furnace for use in the production of an optical fiber according to the present invention.

A method and an apparatus for producing an optical fiber according to the present invention will be outlined referring to FIG. 1. Although a resistance furnace for heating a susceptor using a heater is taken as an example and described below, the present invention is also applicable to an induction furnace for induction heating its susceptor using high-frequency power applied to a coil.

In the figure, numeral 10 designates a drawing furnace, numeral 11 designates an optical fiber preform (preform), numeral 11a designates the lower end section of the preform, numeral 12 designates a glass fiber, numeral 13 designates a susceptor, numeral 14 designates a furnace body, numeral 15 designates a heater, numerals 16 and 18 designate heat insulators, numeral 17 designates a protective pipe, numeral 17a designates a heat insulating region, and numeral 17b designates a non-heat insulating region.

Glass fiber drawing is carried out as shown in FIG. 1 by using a process in which the lower section of the optical fiber preform 11 (hereafter referred to as a preform) being suspended and supported is heated and melted, the glass fiber 12 is melted and allowed to droop from the lower end section 11a of the preform, and the glass fiber 12 is drawn so as to have a predetermined glass fiber diameter. The optical fiber drawing furnace 10 for this purpose is configured such that the heater 15 for heating is disposed so as to enclose the susceptor 13 into which the preform 11 is inserted and supplied, such that the heater 15 is enclosed with the heat insulator 16 made of carbon, such as a carbon felt or a molded heat insulator made of carbon, so that the heat of the heater 15 is not dissipated to the outside, and such that the entire exterior thereof is enclosed with the furnace body 14.

The preform 11 is suspended and supported by a suspending mechanism (not shown) and is controlled so as to be moved sequentially downward as the glass fiber drawing proceeds. The furnace body 14 is made of a metal being superior in corrosion resistance, such as stainless steel, and the susceptor 13 having a cylindrical shape and made of high purity carbon, described later, is disposed in the central area thereof. In order that the susceptor 13 is prevented from being oxidized and degraded, an inert gas or the like, such as argon, helium or nitrogen, is supplied into the susceptor 13, and this inert gas or the like passes through the clearance between the preform 11 and the susceptor 13 and the most of the gas is discharged to the outside together with the glass fiber 12 having been drawn via the protective pipe 17 provided so as to be extended from the susceptor 13 to the lower section of the drawing furnace 10.

The protective pipe 17 has a function of relieving the glass fiber 12 having been heated and softened from being cooled quickly and at the same time a function of cooling and curing the glass fiber to some extent to suppress the variation in the diameter of the glass. A shutter or the like is provided at the lower end of the protective pipe 17 in some cases. The protective pipe 17 is made of carbon similar to that used for the susceptor or a metal, such as stainless steel, can be separated from the susceptor 13 and is disposed so as to be connected to the lower end of the susceptor 13.

In the present invention, when the glass fiber is drawn using the drawing furnace 10 configured as described above, a gas containing 50% or more or 85% or more of Ar or $N_2$ gas is used as the inert gas or the like to be supplied into the susceptor 13. In other words, 100% of Ar or $N_2$ gas may be used; even in the case that a mixture gas of He gas and Ar or $N_2$ gas is used, a gas containing 50% or more or 85% or more of Ar or $N_2$ gas is used.

The glass fiber 12 melted and drooping from the lower end section 11a of the preform 11 can be suppressed from being cooled quickly and the structural relaxation of the glass fiber can be promoted easily when Ar or $N_2$ gas is used, in comparison with the case in which 100% of He gas is used.

The structural relaxation of the glass fiber is promoted effectively when a gas containing 50% or more of Ar or $N_2$ gas is used, whereby a temperature adjustment gas or the like for slow cooling, disclosed in Patent Documents 1 and 2, is not required to be introduced into the neighborhood of the outlet of the susceptor 13. As a result, the glass fiber is not affected by stagnation and interference due to the introduction of a gas from another port, whereby it is possible to eliminate factors for causing the vibration of the glass fiber and the variation of the diameter of the glass fiber. Furthermore, the use of the expensive He gas can be reduced by 50% or more, whereby the effect in cost reduction is significant.

In the case that the ratio of Ar or $N_2$ gas is raised to 85% or more, the structural relaxation of the glass fiber can be promoted further, and the cost can be reduced further.

The upper side (upstream side) of the protective pipe 17 provided on the lower side of the drawing furnace 10 is enclosed with the heat insulator 18 so that heat is suppressed from being dissipated from here, whereby the quick cooling of the glass fiber immediately after drawing is relieved. When it is assumed that the range covered with the heat insulator 18 is the heat insulating region 17a, it is preferable that the temperature of the glass fiber 12 should be maintained at 1800° C. or less inside the heat insulating region 17a. In this case, the structural relaxation of the glass fiber in the process in which the glass is cooled can be promoted easily.

In the case that the ratio of Ar or $N_2$ gas in the inert gas or the like is higher, the structural relaxation of the glass fiber can be promoted further; hence, in the case that the ratio of Ar or $N_2$ gas is higher, the heat insulating region 17a can be made shorter.

Figure 2:
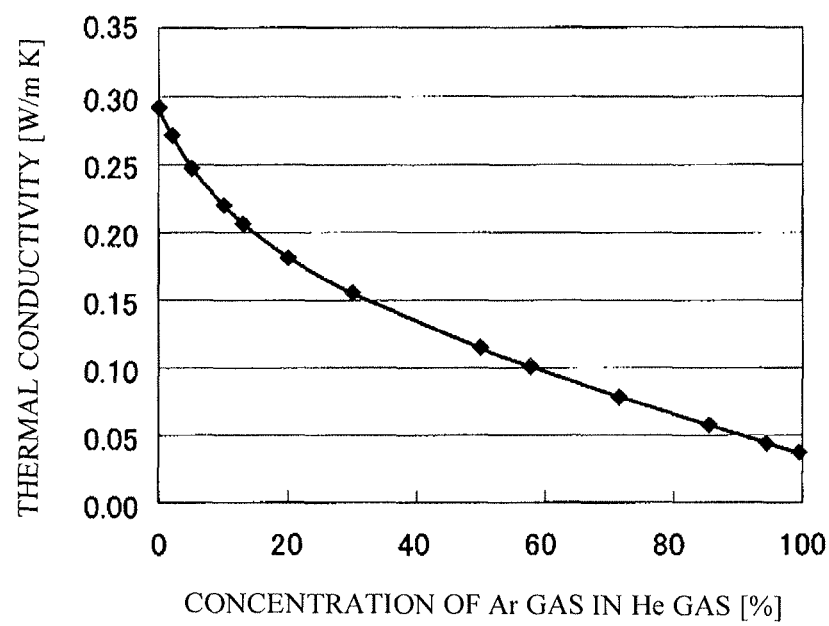
FIG. 2 is a graph showing the dependence of thermal conductivity on the concentration of Ar gas in He gas.

FIG. 2 is a graph showing the dependence of thermal conductivity on the concentration of Ar gas in He gas as an example; according to this graph, it is found that the thermal conductivity becomes lower as the ratio of Ar gas is higher and that the quick cooling of the glass fiber can be relieved.

The lower side (downstream side) of the heat insulating region 17a is provided with the non-heat insulating region 17b having no heat insulator (down to the lower end position of the protective pipe), whereby the cooling of the glass fiber 12 after the structural relaxation is promoted further than the cooling on the upper side. In other words, it is preferable that in the glass fiber, the glass structure of which has been immobilized, the cooling of the glass fiber thereafter should be carried out quickly to some extent so that the height of the apparatus (the length of the protective pipe) is suppressed so as not to be excessive.

However, in the case that Ar or $N_2$ gas is used and the heat insulating region 17a of the protective pipe 17 is provided, if the outer diameter of the glass fiber on the outlet side is not reduced sufficiently and if the outer diameter at the outlet of the protective pipe 17 is larger than a target value (the final outer diameter) by a predetermined value or more, the variation in the diameter of the glass fiber also increases.

Figure 3A:
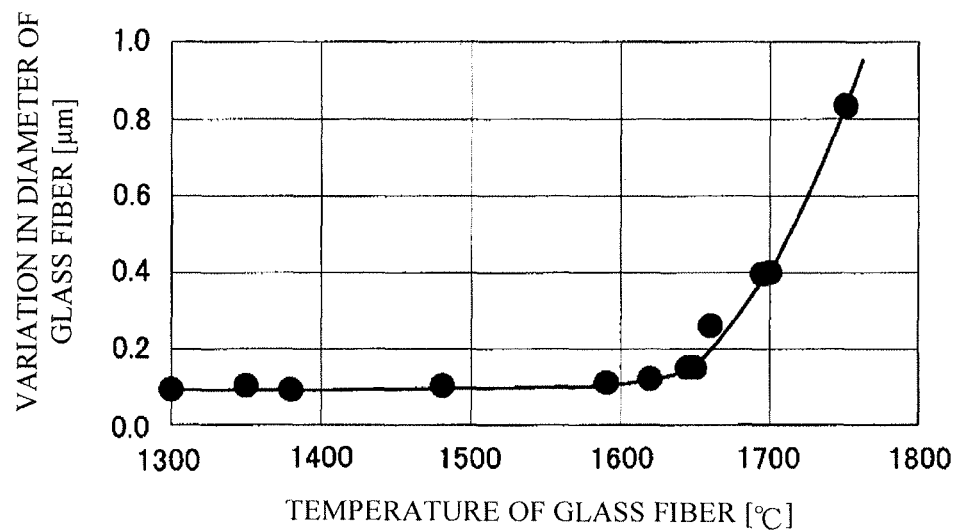
FIG. 3 is a graph showing the relationship between the temperature of a glass fiber and the variation in the diameter of the glass fiber and the relationship between the temperature and the outer diameter of the glass fiber at the outlet of a protective pipe.
Figure 3B:
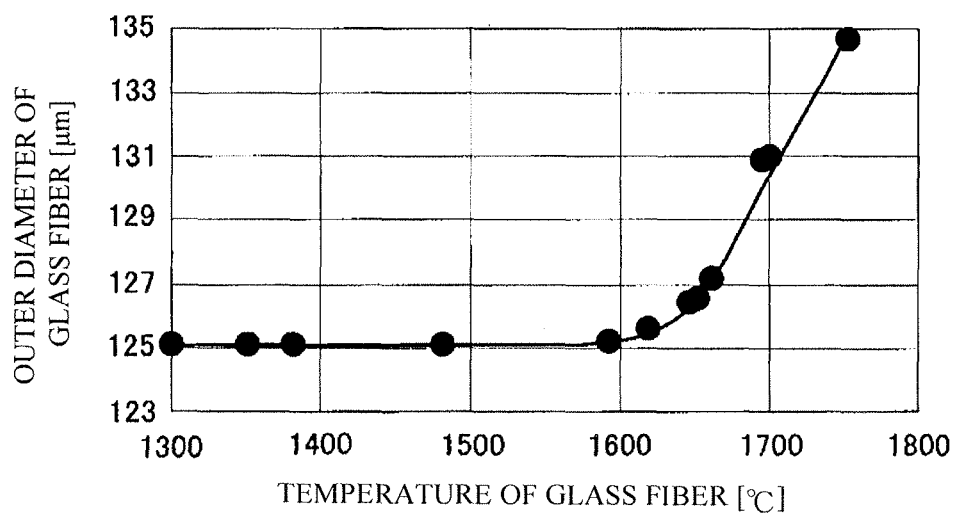

In other words, since the glass fiber drawn out of the outlet of the protective pipe 17 is directly exposed to the outside air, the outer diameter of the glass fiber is required to be reduced to the target outer diameter+6 µm or less, preferably the target outer diameter+1.6 µm or less, further preferably the target outer diameter+0.2 µm or less. For this purpose, it is preferable that the glass fiber 12 inside the non-heat insulating region 17b should be cooled to 1700° C. or less, preferably 1650° C. or less, further preferably 1500° C. or less. As the temperature of the glass fiber is higher, the variation in the diameter of the glass fiber tends to become larger as shown in FIG. 3(A); furthermore, as shown in FIG. 3(B), when the target value of the diameter of the glass fiber is 125 µm, the outer diameter at the outlet of the protective pipe 17 tends to become larger than the target value.

The temperature of the glass fiber at the outlet of the drawing furnace can be measured using an infrared sensor or the like, and the diameter of the glass fiber can be measured using a laser outer diameter measuring instrument or the like.

The lengths of the protective pipe and the heat insulating region, required so that the temperature of the glass fiber is set to the above-mentioned predetermined temperature, depend on the velocity (m/min) of the glass fiber to be drawn; the lengths are required to be made larger as the velocity is higher. When it is assumed that the length of the protective pipe is Da (mm) and that the length of the heat insulating region is Db (mm), in the case that a gas containing 50% or more of Ar or $N_2$ gas is used as the gas to be supplied into the susceptor, it is preferable that V/Da≤1.2 and V/Db≤2.3 should be established. When these expressions are applied, Da≥833 mm and Db≥435 mm are obtained at a drawing velocity of 1000 (m/min), for example.

It is further preferable that V/Da≤1.0 and V/Db≤2.3 should be established; when these expressions are applied, Da≥1000 mm and Db≥435 mm are obtained at a drawing velocity of 1000 (m/min), for example.

In the case that a gas containing 85% or more of Ar or $N_2$ gas is used as the gas to be supplied into the susceptor, it is preferable that V/Da≤1.2 and V/Db≤7.7 should be established. When these expressions are applied, Da≥833 mm and Db≥130 mm are obtained at a drawing velocity of 1000 (m/min), for example.

It is further preferable that V/Da≤1.0 and V/Db≤7.7 should be established; when these expressions are applied, Da≥1000 mm and Db≥130 mm are obtained at a drawing velocity of 1000 (m/min), for example.

The heat insulating region 17a of the protective pipe 17 can be formed by providing the heat insulator 18 on the outer circumference of the protective pipe 17. The heat insulator 18 can be made of the same material as that of the heat insulator 16 for covering the heater 15 of the drawing furnace and is used to suppress the heat of the protective pipe 17 having been heated by the heater 15 from being dissipated to the outside. The heat insulating region 17a relieves the glass fiber 12 melted and drooping from the lower end section 11a of the preform 11 from being cooled quickly and can promote the structural relaxation of the glass fiber. Hence, a separate supply of Ar or $N_2$ gas into the heat insulating region 17a and a heating process using a heating apparatus, having been required conventionally, are not required any more; as a result, a large-scale gas supplying apparatus and a large-scale heating apparatus are not required, and the cost for producing the optical fiber can be reduced.

As described above, by the use of Ar or $N_2$ gas, the production cost can be reduced, the structural relaxation of the glass fiber is promoted and the fictive temperature of the glass is shifted to the low temperature side, the arrangement states of atoms and molecules inside the glass can be put in order, and the Rayleigh scattering intensity of the optical fiber can be reduced and the transmission loss thereof can be decreased.

However, the thermal conductivity of Ar or $N_2$ gas is smaller (approximately one-eighth the thermal conductivity of He gas) than that of He gas and the shape of the neck-down region of the lower end section 11a of the preform is extended; hence, in the case that Ar or $N_2$ gas is used, the neck-down region is likely to be affected by disturbance (for example, the flow of the gas).

For example, the shape of the neck-down region and the diameter of the drooping glass fiber are liable to vary in sensitive response to the disturbance of the gas flowing therearound. Hence, it may be possible that the diameter of the susceptor 13 is reduced so as to conform to the shape of the neck-down region in the neighborhood of the lower end section 11a of the preform, thereby suppressing the flow of the inert gas or the like from being disturbed. With this reduction in the diameter, the heat radiated from the heater 15 is effectively reflected to the preform, whereby heating efficiency can be raised.

In addition, the variation in the diameter of the glass fiber is caused also depending on the variation in the pressure inside the susceptor. However, as a result of an investigation, it is found that the variation in the diameter of the glass fiber can be limited to a desired value (±0.4 µm or less) by decreasing the variation in the pressure at 1 Hz or less inside the susceptor. The variation in the diameter of the glass fiber can be defined as a value three times the dispersion (standard deviation) of the diameter of the glass fiber. Incidentally, in the case that He gas is used, it is found that the variation in the diameter is almost unaffected by the variation in the pressure. The pressure inside the susceptor can be measured easily by providing a pressure measurement port at an appropriate place of the drawing furnace and by installing a pressure meter.

The variation in the pressure inside the susceptor will also occur depending on the flowing state of the gas inside the protective pipe 17. More specifically, in the case that the value (Gr/Re$^2$) obtained by dividing the Grashof number Gr inside the protective pipe by the square of the Reynolds number Re is larger than 1, the flow of the gas inside the protective pipe is disturbed by the effect of buoyancy and a pressure variation is induced. This pressure variation acts on the lower end section 11a of the preform, thereby causing the variation in the diameter of the glass fiber. Hence, it is preferable that the inner diameter of the protective pipe or the like should be set so that the above-mentioned value (Gr/Re$^2$) is 1 or less inside the protective pipe.

The Grashof number Gr and the Reynolds number Re are represented by the following expressions in the case that the flow velocity of the gas is w, that the dynamic viscosity coefficient is ν, that the inner diameter of the protective pipe is d, that the gravitational acceleration is g, that the volume expansion coefficient is β, and that the temperature difference is Δθ.

Reynolds number $Re = wd/\nu$

Grashof number $Gr = (d^3 g \beta \Delta\theta)/(\nu^2)$

In the drawing process for a quartz-based glass fiber, β=1/T can be established, and calculations are carried out by using T (temperature)=1850K (Kelvin) and Δθ=1550K as representative values. The flow velocity w of the gas is the sum of the flow velocity w1 of the gas to be introduced into the furnace and the flow velocity (dragging flow) w2 of the furnace gas that depends on the drawing velocity and is dragged by the glass fiber.

In the optical fiber produced using the above-mentioned method, the structural relaxation of the glass can be promoted by the use of Ar or $N_2$ gas and by the adoption of the slow cooling structure composed of the protective pipe whose upper section is enclosed with the heat insulator; as a result, the fictive temperature can be lowered, the transmission loss can be decreased to some extent, and the production cost can be reduced significantly, in comparison with the case in which He gas is used and the slow cooling structure is not provided. Furthermore, the outer diameter of the glass fiber at the time when the glass fiber is exposed to the outside air can be reduced by keeping the temperature of the glass fiber at the outlet of the protective pipe within a predetermined range and by reducing the outer diameter to the target outer diameter+6 µm or less inside the protective pipe; moreover, the variation in the diameter of the glass fiber can be reduced by suppressing the pressure variation. It is preferable that the variation in the diameter of the glass fiber should be ±0.4 µm or less. With this optical fiber, the yield of the connection to multi-core optical connectors can be improved, and the loss in the connection can be decreased.

In the case that the fictive temperature of the glass fiber is lowered by 30° C., for example, during the cooling in the glass fiber drawing process, the transmission loss can be decreased by approximately 0.002 dB/km at a wavelength band of approximately 1.55 µm. In other words, the structural relaxation of the glass can be promoted and the transmission loss thereof can be decreased by lowering the fictive temperature.

Since the calculated value of the fictive temperature is different depending on the measurement method or calculation expression used, it is preferable that the fictive temperature should be assumed at the peak position of the reflectance spectrum or the peak position of the absorption spectrum being dependent on the fictive temperature.

In other words, in the case of the glass fiber according to the present invention having been drawn using the above-mentioned method, it is preferable that the peak position of the reflectance spectrum around 1120 $cm^{-1}$ should be located at 1119.83 $cm^{-1}$ or more or that the peak position of the absorption spectrum around 2250 $cm^{-1}$ should be located at 2248.54 $cm^{-1}$ or more.

Figure 4:
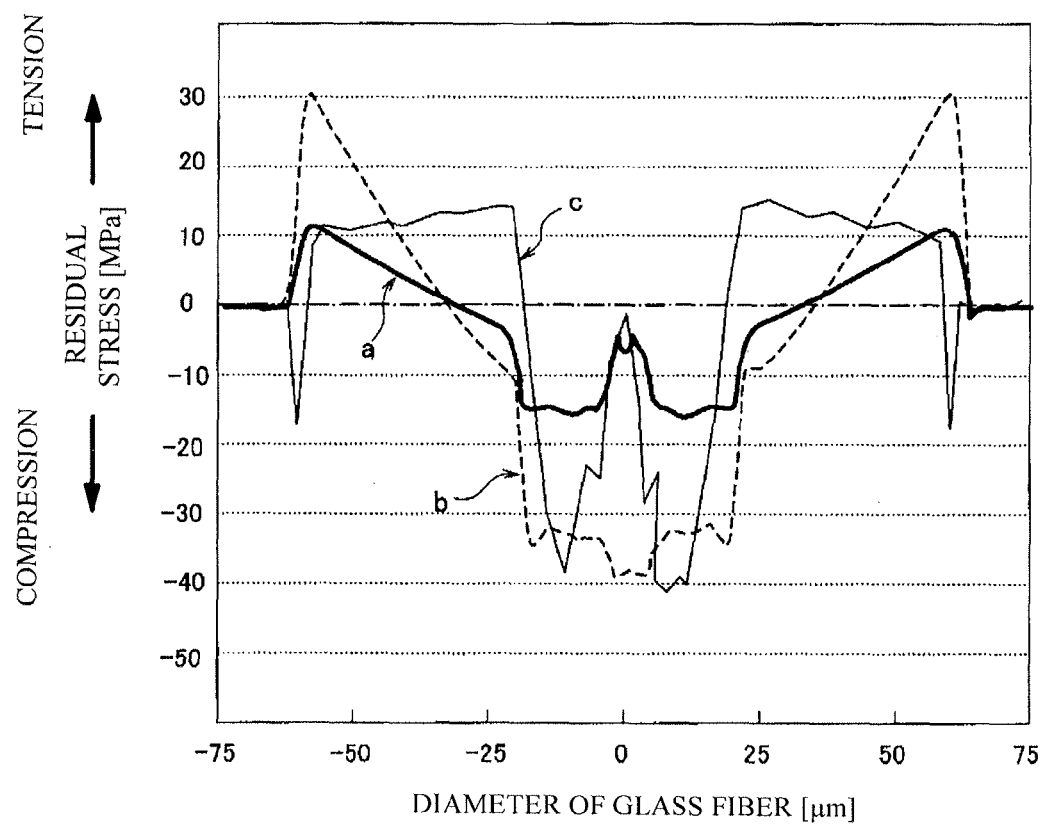
FIG. 4 is a graph illustrating the residual stress of the glass fiber according to the present invention.

In addition, the cooled glass fiber has residual stress in tension and compression. FIG. 4 is a graph showing an example of the residual stress (clad stress) in the radial direction of the glass fiber. In the figure, "a" represents an example of the optical fiber according to the present invention having been drawn using the method in which Ar gas was used, "b" represents an example of the optical fiber having been drawn using the conventional method in which He gas was used, and "c" represents an example of the optical fiber disclosed in Patent Document 3. In the figure, the residual stress being zero or higher is tensile stress and the residual stress being lower than zero is compressive stress.

In the optical fiber "b" that was cooled using the conventional method in which He gas was used, without being subjected to slow cooling, the He gas having high thermal conductivity makes contact with the outer face of the glass fiber, and the glass fiber is cooled quickly; as a result, large residual stress occurs because of the tension acting on the outer circumferential side of the clad layer of the glass fiber. Furthermore, residual stress occurs because of the compression applied to the inside of the clad layer, and in the core region at the center, residual stress occurs because of the compression. In other words, the optical fiber has a large difference in the distribution of the residual stress in the radial direction.

On the other hand, in the optical fiber "c" disclosed in Patent Document 3, tensile stress occurs in almost the entire region of the clad layer, and the tensile stress decreases from the inside to the outside of the clad layer. According to this stress distribution, since the difference in the distribution of the residual stress of the glass fiber in the radial direction is small, it can be expected that the transmission loss is small and the Rayleigh scattering intensity is kept low. However, obtaining such a stress distribution means that heat treatment consisting of temperature decrease, temperature increase and temperature decrease is conducted in this order in the cooling process of the glass fiber. The variation in the temperature of the glass fiber indicates that the temperature of the ambient gas does not vary monotonously and the flow of the gas is liable to be disturbed; hence, there is a danger that the variation in the diameter of the glass fiber may increase. Moreover, such a special heat treatment apparatus (slow cooling apparatus) as disclosed in Patent Document 2 is required for the heat treatment of the glass fiber.

On the other hand, in the glass fiber "a" according to the present invention having been cooled slowly in the above-mentioned heat insulating region using Ar gas, the Ar gas having low thermal conductivity makes contact with the outer circumferential face of the glass fiber, and the quick cooling of the glass fiber is relieved at the heat insulating region in which the heat insulator is disposed around the protective pipe. As a result, the tensile stress on the outer circumferential side of the clad layer is decreased, and residual stress increasing monotonously and gradually from the inside to the outside of the clad layer is obtained.

More specifically, the gradient at the time when the stress distribution from the inside to the outside of the clad layer is subjected to straight-line approximation is formed so as to have a value of +0.0 MPa/µm to +0.5 MPa/µm. At this gradient, a state is obtained in which the difference in the distribution of the residual stress in the radial direction is small, the distortion in the internal stress is small, and the increase in the transmission loss due to the fluctuation in the density of glass or the like is reduced effectively.

FIG. 5 shows the results of a test conducted to evaluate production methods in which the target value of the variation in the diameter of the above-mentioned glass fiber is ±0.4 (µm) or ±0.15 (µm) or less and the target value of the transmission loss thereof is 0.185 (dB/km) or less. Each of optical fiber samples (Samples 1 to 14) used in the test is a single-mode optical fiber having a glass fiber diameter of 125 µm, and the drawing furnace used for optical fiber production has the structure shown in FIG. 1; the test was conducted depending on the presence or absence of the heat insulating region 17a at the upper section of the protective pipe 17 and depending on four kinds of gases to be introduced into the susceptor: 100% of He gas, 100% of Ar gas, a mixture gas containing 50% of Ar gas and 50% of He gas, and a mixture gas containing 85% of Ar gas and 15% of He gas.

Sample 1 was obtained using a nearly standard production method in which 100% of He gas was introduced into the susceptor and the heat insulating region 17a was not provided at the upper section of the protective pipe. According to the result of the evaluation, the transmission loss did not reach the target value and was nearly equal to that of the conventional optical fiber although the variation in the diameter of the glass fiber was small.

Sample 2 was obtained with the heat insulating region 17a not provided as in the case of Sample 1 using the same method as that used for Sample 1, except that a mixture gas containing 50% of Ar gas and 50% of He gas was used as the gas to be introduced into the susceptor. According to the result of the evaluation, the variation in the diameter of the glass fiber did not reach the target value; for this reason, the other properties thereof were not measured.

Sample 3 was obtained with the heat insulating region not provided as in the case of Sample 1 using the same method as that used for Samples 1 and 2, except that a mixture gas containing 85% of Ar gas and 15% of He gas was used as the gas to be introduced into the susceptor. According to the result of the evaluation, the value ($Gr/Re^2$) became large, and the variation in the diameter of the glass fiber was larger that that in the case of Sample 2.

Sample 4 was obtained using 100% of Ar gas as the gas to be introduced into the susceptor and with the heat insulating region 17a having approximately a half length of the protective pipe provided at the upper section of the protective pipe 17. According to the result of the evaluation, although the variation in the diameter of the glass fiber was smaller than that in the case of Sample 3, the temperature at the outlet of the protective pipe did not lower sufficiently and the value (Gr/Re$^2$) was larger than 1, whereby the variation in the diameter of the glass fiber did not reach the target value.

Sample 5 was obtained with the heat insulating region 17a provided at the upper section of the protective pipe as in the case of Sample 4 using a mixture gas containing 50% of Ar gas and 50% of He gas as the gas to be introduced into the susceptor as in the case of Sample 2. However, the length Db of the heat insulating region 17a was shortened to approximately a half of the length in the case of Sample 4. According to the result of the evaluation, although the variation in the diameter of the glass fiber was improved more than that in the case of Sample 4, the stress gradient (clad stress) at the clad section was not lowered, and the transmission loss did not reach the target value.

Sample 6 was obtained with the heat insulating region 17a provided as in the case of Sample 5 using a mixture gas containing 50% of Ar gas and 50% of He gas as the gas to be introduced into the susceptor. However, the heat insulating region 17a at the upper section of the protective pipe 17 had approximately a half length of the protective pipe as in the case of Sample 4. According to the result of the evaluation, the transmission loss was in the range of the target value or less, and the variation in the diameter of the glass fiber was able to have a value of ±0.10 μm, which was in the range of the target value or less. In other words, it may be said that the variation in the diameter of the glass fiber can be suppressed by setting the heat insulating region 17a at the upper section of the protective pipe 17 to the predetermined length.

Sample 7 was obtained with the heat insulating region 17a provided as in the case of Sample 6 using 100% of Ar gas to be introduced into the susceptor, and the value (Gr/Re$^2$) was 0.1, which was smaller than that in the case of Sample 6. According to the result of the evaluation, the transmission loss reached the target value and the variation in the diameter of the glass fiber was able to have a value of ±0.4 μm, which was in the range of the target value or less. In other words, it may be said that the variation in the diameter of the glass fiber can be suppressed by setting the value (Gr/Re$^2$) to 1 or less although 100% of Ar gas was used.

Sample 8 was obtained with the heat insulating region 17a provided as in the case of Sample 7 using 100% of Ar gas to be introduced into the susceptor. However, the length of the protective pipe 17 was 1.3 times longer than that in the case of Sample 7. The value (Gr/Re$^2$) was 0.1, which was the same as that in the case of Sample 7. According to the result of the evaluation, the transmission loss reached the target value, and the variation in the diameter of the glass fiber was able to have a value of ±0.15 μm, which was smaller than that in the case of Sample 7.

Sample 9 was obtained with the heat insulating region 17a provided as in the case of Sample 7 using a mixture gas containing 85% of Ar gas and 15% of He gas as the gas to be introduced into the susceptor. However, the heat insulating region 17a at the upper section of the protective pipe 17 had a length 0.15 times the length of the protective pipe, which was shorter than that in the case of Sample 7. The value (Gr/Re$^2$) was 0.1, which was equal to that in the case of Sample 7. According to the result of the evaluation, although the transmission loss was slightly higher than that in the case of Sample 7, the transmission loss reached the target value, and the variation in the diameter of the glass fiber was able to have a value of ±0.11 μm, which was smaller than that in the case of Sample 7.

Sample 10 was obtained with the heat insulating region 17a provided as in the case of Sample 9 using 100% of Ar gas to be introduced into the susceptor. The value (Gr/Re$^2$) was 0.1, which was equal to that in the case of Sample 9. According to the result of the evaluation, although the variation in the diameter of the glass fiber was larger than that in the case of Sample 9, the transmission loss reached the target value, and the variation in the diameter of the glass fiber was able to have a value of ±0.39 μm, which was in the range of the target value or less.

Sample 11 was obtained with the heat insulating region 17a provided as in the case of Sample 9 using a mixture gas containing 85% of Ar gas and 15% of He gas as the gas to be introduced into the susceptor. However, the length of the protective pipe was 1.3 times longer than that in the case of Sample 9. The value (Gr/Re$^2$) was 0.1, which was equal to that in the case of Sample 9. According to the result of the evaluation, the transmission loss reached the target value, and the variation in the diameter of the glass fiber was able to have a value of ±0.10 μm, which was in the range of the target value or less.

Sample 12 was obtained with the heat insulating region 17a provided as in the case of Sample 11 using 100% of Ar gas to be introduced into the susceptor. The value (Gr/Re$^2$) was 0.1, which was equal to that in the case of Sample 11. According to the result of the evaluation, the transmission loss reached the target value, and the variation in the diameter of the glass fiber was able to have a value of ±0.15 μm, which was in the range of the target value or less.

Sample 13 was obtained with the heat insulating region 17a having the same length as that in the case of Sample 8 provided using 100% of Ar gas to be introduced into the susceptor also as in the case of Sample 8. However, the length of the protective pipe was approximately 1.3 times longer than that in the case of Sample 8. The value (Gr/Re$^2$) was 0.1. According to the result of the evaluation, the transmission loss reached the target value, and the variation in the diameter of the glass fiber was able to have a value of ±0.10 μm, which was in the range of the target value or less.

Sample 14 was obtained with the heat insulating region 17a having the same length as that in the case of Sample 12 provided using 100% of Ar gas to be introduced into the susceptor also as in the case of Sample 12. However, the length of the protective pipe 17 was approximately 1.3 times longer than that in the case of Sample 12. The value (Gr/Re$^2$) was 0.1. According to the result of the evaluation, the transmission loss reached the target value and that the variation in the diameter of the glass fiber was able to have a value of ±0.10 μm, which was in the range of the target value or less.

In the cases of Samples 6 to 14 exhibiting excellent properties, the peak of the reflectance around 1120 cm$^{-1}$ was located in the range of 1119.83 cm$^{-1}$ or more and the peak of the absorption around 2250 cm$^{-1}$ was located in the range of 2248.54 cm$^{-1}$ or more; on the other hand, in the cases of Samples 1 and 5, the peaks of the reflectance and absorption were outside these ranges.

In the cases of Samples 6 to 14, the clad stress was 0.5 MPa/μm or less; on the other hand, in the cases of Samples 1 and 5, the clad stress was larger than 0.5 MPa/μm.

DESCRIPTION OF REFERENCE NUMERALS AND SIGNS

10 . . . drawing furnace,
11 . . . optical fiber preform (preform),
11a . . . lower end section of preform,
12 . . . glass fiber,
13 . . . susceptor,
14 . . . furnace body,
15 . . . heater,
16, 18 . . . heat insulators,
17 . . . protective pipe,
17a . . . heat insulating region,
17b . . . non-heat insulating region

The invention claimed is:

1. An optical fiber producing method, using an apparatus comprising a susceptor into which an optical fiber preform is inserted and a heater disposed outside the susceptor to heat the susceptor from the outside, for producing an optical fiber by drawing a glass fiber while the optical fiber preform is heated and melted and by drawing out the fiber through the outlet at the lower section of the susceptor to the outside,
   wherein a gas containing 50% or more of argon or nitrogen is used as a gas to be supplied into the susceptor, and a protective pipe with a length of Da (mm) is provided under the susceptor, the protective pipe having a heat insulating region enclosed with a heat insulator with a length of Db (mm) at the upper section thereof and a non-heat insulating region not enclosed with any heat insulators at the lower section thereof, and
   wherein, when the drawing velocity of the glass fiber is V (m/min), the lengths of Da and Db are set to satisfy "V/Da≤1.2 and V/Db≤2.3" so that the temperature of the glass fiber at the outlet of the protective pipe becomes 1700° C. or less and so that the outer diameter of the glass fiber at the outlet of the protective pipe is within a range of the target outer diameter of the glass fiber+6 μm or less.

2. An optical fiber producing method, using an apparatus comprising a susceptor into which an optical fiber preform is inserted and a heater disposed outside the susceptor to heat the susceptor from the outside, for producing an optical fiber by drawing a glass fiber while the optical fiber preform is heated and melted and by drawing out the fiber through the outlet at the lower section of the susceptor to the outside,
   wherein a gas containing 85% or more of argon or nitrogen is used as a gas to be supplied into the susceptor, and a protective pipe with a length of Da (mm) is provided under the susceptor, the protective pipe having a heat insulating region enclosed with a heat insulator with a length of Db (mm) at the upper section thereof and a non-heat insulating region not enclosed with any heat insulators at the lower section thereof, and
   wherein, when the drawing velocity of the glass fiber is V (m/min), the lengths of Da and Db are set to satisfy "V/Da≤1.2 and V/Db≤7.7" so that the temperature of the glass fiber at the outlet of the protective pipe becomes 1700° C. or less and so that the outer diameter of the glass fiber at the outlet of the protective pipe is within a range of the target outer diameter of the glass fiber+6 μm or less.

3. The optical fiber producing method according to claim 1,
   wherein "V/Da≤1.0" is satisfied, the temperature of the glass fiber at the outlet of the protective pipe is 1650° C. or less, and the outer diameter of the glass fiber at the outlet of the protective pipe is within a range of the target outer diameter of the glass fiber+1.6 μm or less.

4. The optical fiber producing method according to claim 1,
   wherein the value obtained by dividing the Grashof number Gr inside the protective pipe by the square of the Reynolds number Re is 1 or less.

* * * * *